United States Patent
Pan (10) Patent No.: US 10,661,724 B2
(45) Date of Patent: May 26, 2020

(54) VEHICLE-USE CAMERA AND AUTOMOBILE

(71) Applicant: GLOBAL MEDIA INDUSTRY GROUP CO., LTD., Shenzhen (CN)

(72) Inventor: Lei Pan, Shenzhen (CN)

(73) Assignee: Global Media Industry Group Co., Ltd., Shenzhen, Guangdong (CN)

(*) Notice: Subject to any disclaimer, the term of this patent is extended or adjusted under 35 U.S.C. 154(b) by 0 days.

(21) Appl. No.: 16/307,589

(22) PCT Filed: Mar. 20, 2018

(86) PCT No.: PCT/CN2018/079655
§ 371 (c)(1),
(2) Date: Dec. 6, 2018

(87) PCT Pub. No.: WO2019/095595
PCT Pub. Date: May 23, 2019

(65) Prior Publication Data
US 2019/0275957 A1 Sep. 12, 2019

(30) Foreign Application Priority Data
Nov. 16, 2017 (CN) .......................... 2017 1 1137793

(51) Int. Cl.
*B60R 11/04* (2006.01)
*B60R 16/02* (2006.01)
(Continued)

(52) U.S. Cl.
CPC .............. *B60R 11/04* (2013.01); *B60R 16/02* (2013.01); *H02G 3/04* (2013.01); *H04N 5/2252* (2013.01);
(Continued)

(58) Field of Classification Search
CPC ... B60R 11/04; B60R 16/02; B60R 2011/004; B60R 2300/105; H02G 3/04; H04N 5/2252; H04N 7/181; H04N 5/2257
See application file for complete search history.

(56) References Cited

U.S. PATENT DOCUMENTS 7,304,239 B1 12/2007 Harris et al.
2007/0228703 A1* 10/2007 Breed .................. B60N 2/0232
280/735
2016/0065796 A1* 3/2016 Happy .................... B60R 1/006
348/376

FOREIGN PATENT DOCUMENTS

CN 201086680 Y 7/2008
CN 104577898 A 4/2015
(Continued)

OTHER PUBLICATIONS

International Search Report for PCT/CN2018/079655, dated Aug. 8, 2018, 5 pages.
(Continued)

*Primary Examiner* — Tracy Y. Li
(74) *Attorney, Agent, or Firm* — Klarquist Sparkman, LLP (57) ABSTRACT

A vehicle-use camera, and an automobile are provided, relating to the technical field of automobile parts and equipment. The vehicle-use camera includes a housing (100), a camera body (200), a wire rod (300), a wiring portion (400) and fixing devices (500). The wire rod (300) can be fixed by the wiring portion (400), the wiring portion (400) is connected with the side edge of the vehicle body by a fixing section (401), a wiring section (402) is configured to run through a gap between a vehicle door (600) and a front fender (700), bringing the wire rod (300) to pass through the gap between the vehicle door (600) and the front fender (700) to protrude into the vehicle, thus the vehicle door (Continued)

(700) does not need to be disassembled, the wire rod (300) can be arranged inside the vehicle in an ordered and attached way by the plurality of fixing devices (500), the direction in which the wire rod (300) runs is controlled, alleviating the technical problems existing in the prior art that the wiring harnesses are scattered inside the vehicle door (600), and the vehicle door (600) needs to be disassembled when wiring is arranged in a rubber pipe connected with the vehicle door (600) and with the vehicle body, which leads to a long time for installation, and causes the buckles of the vehicle door (600) to be easily damaged and the vehicle door (600) to be loosened, and causes a vibration noise; and the installation difficulty of side cameras is reduced, and promotion and application of the product are facilitated.

19 Claims, 5 Drawing Sheets

(51) Int. Cl.
*H02G 3/04* (2006.01)
*H04N 5/225* (2006.01)
*H04N 7/18* (2006.01)
*B60R 11/00* (2006.01)

(52) U.S. Cl.
CPC ........ *H04N 7/181* (2013.01); *B60R 2011/004* (2013.01); *B60R 2300/105* (2013.01)

(56) References Cited

FOREIGN PATENT DOCUMENTS

| | | | |
|---|---|---|---|
| CN | 205292485 U | 6/2016 | |
| CN | 107745685 A | 3/2018 | |
| JP | 2004-182188 A | 7/2004 | |
| JP | 2008-148444 A | 6/2006 | |
| KR | 2019-15824 B | * 6/2017 | ............... B60R 1/08 |

OTHER PUBLICATIONS

Written Opinion for PCT/CN2018/079655, dated Aug. 8, 2018, 4 pages.

* cited by examiner

VEHICLE-USE CAMERA AND AUTOMOBILE

CROSS REFERENCE TO RELATED APPLICATION

This is the U.S. National Stage of International Application No. PCT/CN2018/079655, filed Mar. 20, 2018, which in turn claims the priority to a Chinese patent application No. CN2017111377931, filed with the State Intellectual Property Office on Nov. 16, 2017 and entitled "Vehicle-use Camera and Automobile", the content of which is incorporated herein by reference in entirety.

TECHNICAL FIELD

The present disclosure relates to the technical field of automobile part and equipment, and particularly relates to a vehicle-use camera and an automobile.

BACKGROUND ART

There are blind areas for external rearview mirrors of conventional vehicles due to their structural limitations. In order to observe road conditions in the blind areas to improve safety of driving, many drivers will add cameras at a side of the vehicle or below the external rearview mirror and display the road conditions on a display device inside the vehicle.

In the prior art, for cameras installed to vehicles, generally wires of the cameras are not supported along the way from a door slot to the interior of the automobile, and wire harnesses are scattered inside a vehicle door freely, resulting in a mess condition inside the vehicle which is far from aesthetically pleasing on the one hand; and on the other hand, the scattered wire harnesses are apt to be entangled or crushed by the vehicle door of the automobile during the opening and closing of the vehicle door, thus affecting the service life of the cameras.

In the prior art, a wiring mode is further included, where the wiring of the cameras is arranged inside a rubber pipe connected with the vehicle door and with the vehicle body so as to connect the wires of the cameras with the display device inside the vehicle. However, for the operation, there are problems that the entire vehicle door needs to be disassembled to arrange the wire harnesses, which requires time for installation, and causes the buckles of the vehicle door to be easily broken during the installation process, resulting in that the vehicle door is loosened or there is a vibration noise.

SUMMARY

An object of the present disclosure is to provide a vehicle-use camera so as to alleviate problems existing in the prior art that the wire harnesses are scattered inside the vehicle door, and the vehicle door needs to be disassembled if wiring is arranged in a rubber tube connected with the vehicle door and with the vehicle body, which leads to a long time for installation, and causes the buckles of the vehicle door to be easily damaged and the vehicle door to be loosened, or causes a vibration noise.

Another object of the present disclosure is to provide an automobile comprising the above-described vehicle-use camera and having all the functions of the camera.

Embodiments of the present disclosure are implemented as follows.

An aspect of the present disclosure provides a vehicle-use camera, including: a housing, a camera body, a wire rod, a wiring portion, and a fixing device, wherein the camera body is provided inside the housing, the housing is connected with a side edge of a vehicle body of a vehicle, the wire rod is connected with the camera body, and one end of the wire rod away from the camera body protrudes from the housing; the wiring portion includes a wiring section and a fixing section, wherein the wiring section is connected with the fixing section, the fixing section is connected with an end of the housing where the wire rod protrudes, and the fixing section is connected with a side edge of the vehicle body of the vehicle; the wire rod is connected with the wiring section by the fixing section; the wiring section is configured to run through a gap between the vehicle door and a front fender of the vehicle, to enable the wire rod to pass through the gap between the vehicle door and the front fender to be connected with the display screen inside the vehicle; and a plurality of fixing devices are provided at positions along the wire rod, and the plurality of fixing devices are each connected with the waterproof rubber strip at the vehicle door and at a pillar of the vehicle door, so as to control a direction in which the wire rod runs.

Further, the fixing device includes an arc-shaped and elongate rubber fixing strip provided at a position corresponding to the pillar of the vehicle door.

The wire rod is fixed in a middle groove of the arc-shaped and elongate rubber fixing strip. Further, the wiring section is provided thereon with a plurality of grooves and a plurality of beams, where the plurality of grooves and the plurality of beams are sequentially provided at intervals, and the plurality of beams are each connected with the fixing section, and the wire rod sequentially runs through in the plurality of grooves and the plurality of beams.

Further, the wire rod is fixedly provided in a groove.

Further, the wiring section is located in the fixing section, and the fixing section is detachably connected with a side edge of the vehicle body of the vehicle, so as to connect the wiring section to the vehicle body, with the wiring section and the vehicle body abutting each other.

The fixing section is detachably connected with the housing.

Further, the wiring section and the fixing section are integrally formed, or the wiring section is fixedly connected with the fixing section.

Further, the material of the wiring portion is a flexible material such that the wiring portion can be bent along the gap between the vehicle door and the front fender.

Further, the material of the wiring portion is an alloy material.

Further, a plurality of camera bodies are provided, wherein the plurality of camera bodies are each provided in the housing, and the housing is provided therein with a plurality of camera ports, and lenses of the plurality of camera bodies protrude from the plurality of camera ports, such that the plurality of camera bodies take images in a plurality of orientations.

Further, the housing is provided therein with two camera ports provided at an angle with one another, and two camera bodies are provided, and lenses of the two camera bodies each protrude from the camera ports respectively.

Further, the housing includes a bottom casing and an outer casing.

The bottom casing is connected with the outer casing, a placement cavity is formed between the bottom casing and the outer casing, wherein the plurality of camera bodies are provided in the placement cavity, and the outer casing is provided with the plurality of camera ports respectively in a plurality of directions.

Further, the bottom casing is detachably connected with the outer casing by a threaded fastening connector.

Further, the fixing section includes a first fixing section and a second fixing section.

The first fixing section is fixedly connected with the second fixing section, a plurality of fixing ends are provided along an edge of the first fixing section, and the first fixing section is detachably connected with a side edge of the vehicle body of the vehicle by the fixing ends.

The second fixing section is provided at a position where the bottom casing is connected with the outer casing, and the second fixing section is connected with both the bottom casing and the outer casing, such that the wire rod runs through in the wiring section via the second fixing section.

Further, the first fixing section and the second fixing section are integrally formed, or the first fixing section is fixedly connected with the second fixing section.

Further, the second fixing section is inserted between the bottom casing and the outer casing, wherein the second fixing section is further provided thereon with a hook portion, and the first fixing section is connected with the second fixing section by the hook portion.

Further, the bottom casing is provided with a plurality of placement portions, wherein the plurality of camera bodies are connected with the bottom casing by the plurality of placement portions, such that the lenses of the plurality of camera bodies are fixed at the plurality of camera ports, respectively.

Further, the wire rod is in a flat shape.

Another aspect of the present disclosure provides an automobile, including the vehicle-use camera.

The present disclosure provides a vehicle-use camera, including: a housing, a camera body, a wire rod, a wiring portion, and a fixing device, wherein the camera body is provided in the housing, the housing is connected with a side edge of a vehicle body of a vehicle, the wire rod is connected with the camera body, and one end of the wire rod away from the camera body protrudes from the housing; the wiring portion includes a wiring section and a fixing section, wherein the wiring section is connected with the fixing section, the fixing section is connected with an end of the housing where the wire rod protrudes; the wire rod is connected with the wiring section by the fixing section; the wiring section is configured to run through a gap between the vehicle door and the front fender of the vehicle, to enable the wire rod to pass through the gap between the vehicle door and the front fender to be connected with the display screen inside the vehicle; and a plurality of fixing devices are provided at positions along the wire rod, and the plurality of fixing devices each are connected with the waterproof rubber strip at the vehicle door and the pillar of the vehicle door, so as to control a direction in which the wire rod runs. Compared with the prior art, the camera for a vehicle of the present disclosure includes at least the following beneficial effects: the wire rod can be fixed by the wiring portion, the wiring portion is connected with a side edge of the vehicle body of the vehicle by the fixing section, the wiring section is configured to run through the gap between the vehicle door and the front fender of the vehicle, bringing the wire rod to pass through the gap between the vehicle door and the front fender of the vehicle to protrude into the vehicle, such that there is no need to disassemble the vehicle door, and then the wire rod can be arranged in the vehicle in an ordered and attached way by the plurality of fixing devices, whereby controlling the direction in which the wire rod runs, thus alleviating the existing technical problems in the prior art that the wire harnesses are scattered inside the vehicle door, and the vehicle door needs to be disassembled if wiring is arranged in the rubber tube connected with the vehicle door and with the vehicle body, which requires a long time for installation, and causes the buckles of the vehicle door to be easily damaged and the vehicle door to be loosened, or causes a vibration noise, meanwhile reducing the installation difficulty of the camera at the side.

BRIEF DESCRIPTION OF THE DRAWINGS

Drawings required for use in the description of embodiments or the prior art will be introduced briefly below in order to explain the technical solutions of the embodiments of the present disclosure or of the prior art more clearly, and apparently, the drawings described below are merely illustrative of some embodiments of the present disclosure, and those ordinarily skilled in the art can also obtain, from these drawings, other drawings without using inventive efforts.

REFERENCE NUMERALS

100—housing; 101—outer casing; 111—camera port; 102—bottom casing; 112—placement portion; 200—camera body; 300—wire rod; 400—wiring portion; 401—fixing section; 411—first fixing section; 421—second fixing section; 402—wiring section; 412—beam; 422—groove; 500—fixing device; 600—vehicle door; 700—front fender; 800—display screen.

DETAILED DESCRIPTION

In order to make the object, technical solution and advantages of the embodiments of the present disclosure clearer, the technical solutions of the embodiments in the present disclosure will be clearly and completely described in the following with reference to the accompanying drawings, and it is apparent that the described embodiments are some but not all of the embodiments of the present disclosure. The components of the present disclosure, which are generally described and illustrated in the figures herein, may be arranged and designed in a variety of different configurations.

Therefore, the detailed description of the present disclosure set forth in the accompanying drawings is not intended to limit the scope of the present disclosure as claimed, but merely illustrate selected embodiments of the present disclosure. All the other embodiments, obtained by those skilled in the art in light of the embodiments of the present disclosure without inventive efforts, should fall within the protection scope of the present disclosure.

It should be noted that similar reference numerals and alphabets indicate similar items in the following figures, and therefore, once an item is defined in a drawing, it is not necessary to further define or explain it in the subsequent drawings.

In the description of the present disclosure, it should be indicated that orientation or positional relations indicated by terms such as "center", "up", "down", "left", "right", "vertical", "horizontal", "inside", and "outside" are based on the orientation or positional relations as shown in the figures, only for facilitating description of the present disclosure and simplifying the description, rather than indicating or implying that the referred devices or elements must be in a particular orientation or constructed or operated in the particular orientation, and therefore they should not be construed as limiting the present disclosure. In addition, terms such as "first", "second", and "third" are used for descriptive purposes only, and should not be understood as indicating or implying their relative importance.

In the description of the present disclosure, it should be indicated that unless otherwise expressly specified or defined, terms "mount", "couple", and "connect" if present should be understood in a broad sense, and for example, a connection may be a fixed connection, or a detachable connection, or an integrated connection; may be a mechanical connection or an electric connection; or may be a direct connection, or an indirect connection via an intermediate medium, or may be an internal communication between two elements. The specific meanings of the above-mentioned terms in the present disclosure could be understood by those skilled in the art according to specific situations.

Figure 1:
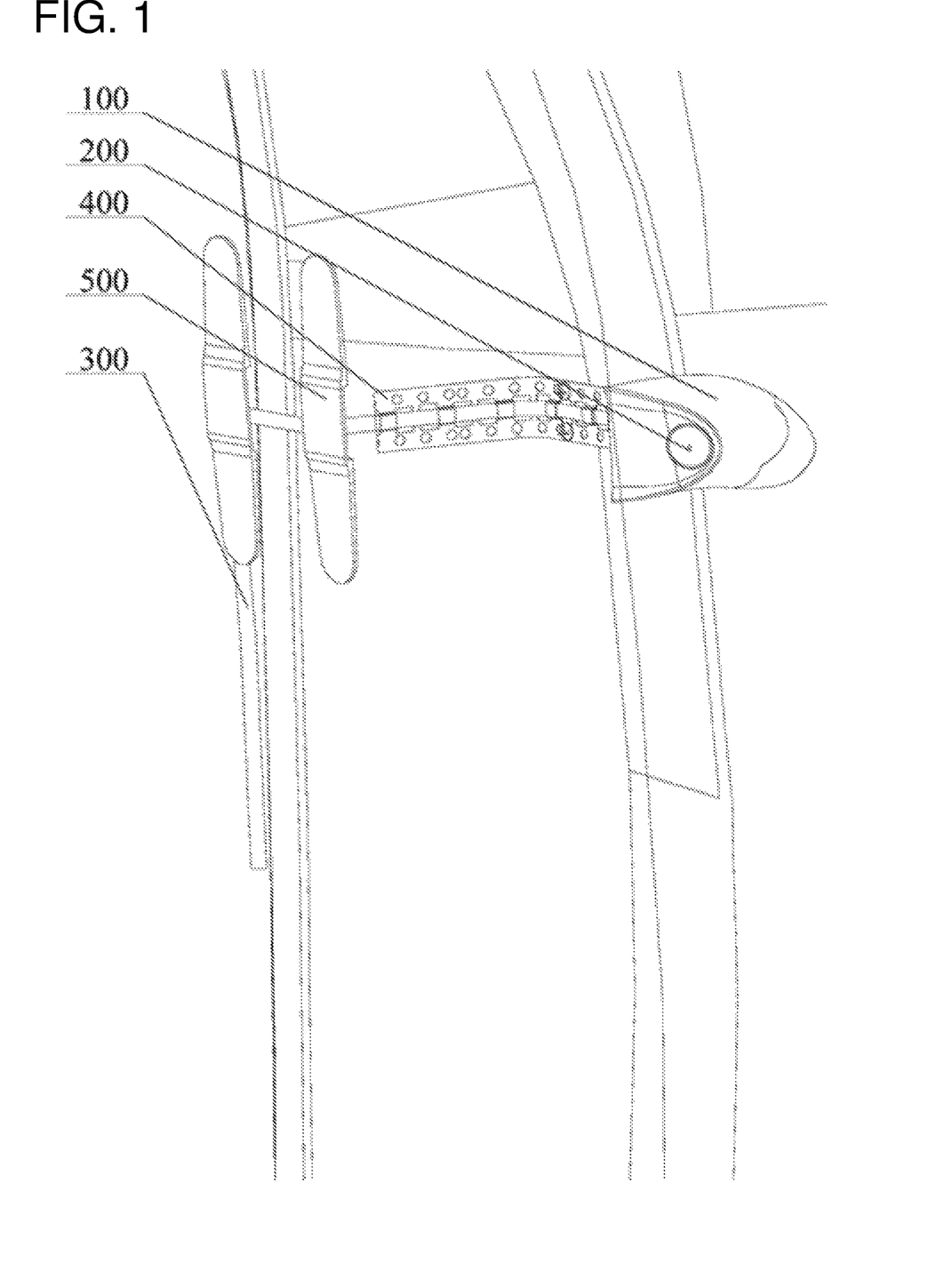
FIG. 1 is a schematic view of an overall structure of a vehicle-use camera provided in the present embodiment.

FIG. 1 is a schematic view of an overall structure of a vehicle-use camera provided in the present embodiment, in which a housing 100 is connected with a side edge of a vehicle body of a vehicle.

Figure 2:
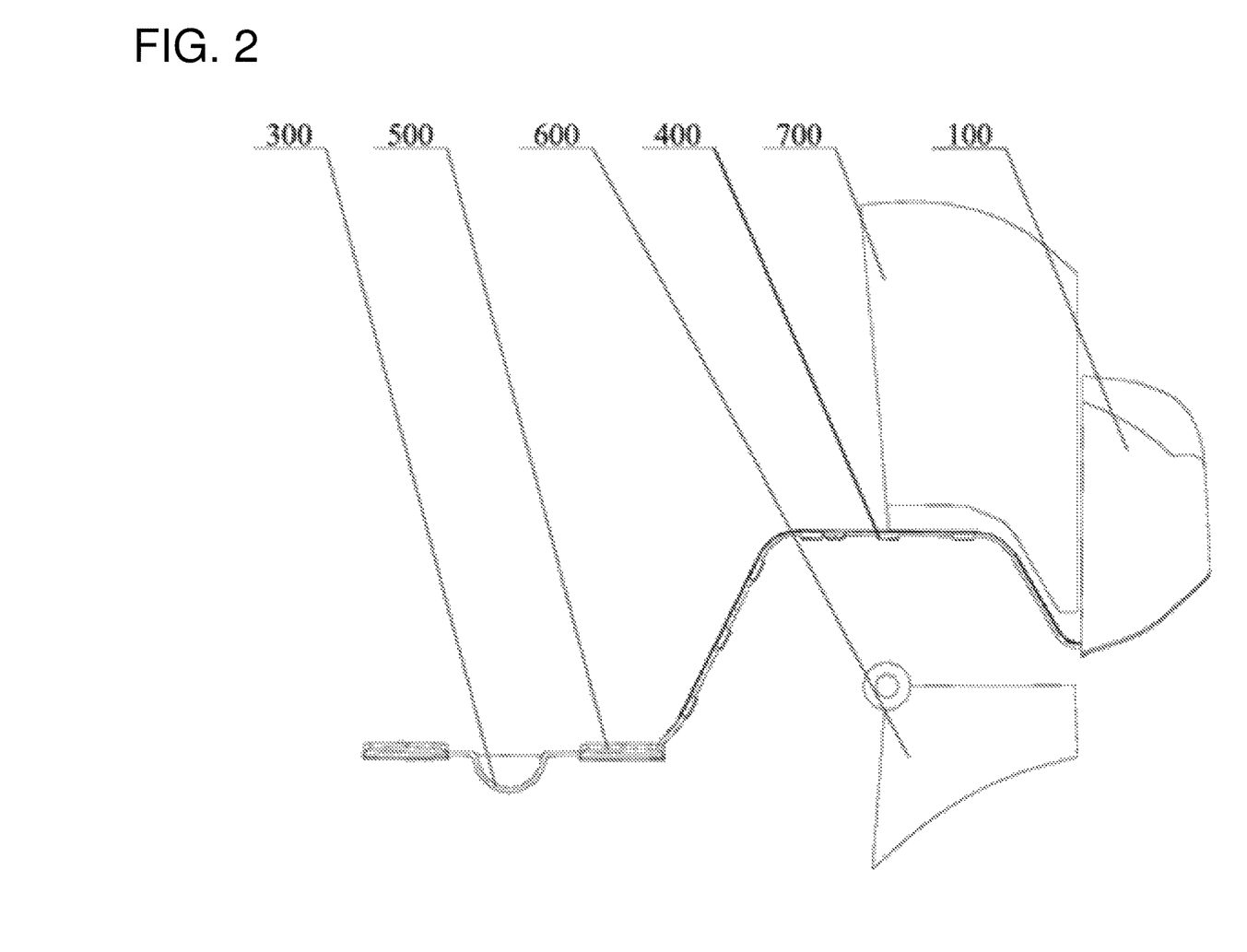
FIG. 2 is a schematic view of a first view of an overall structure of a vehicle-use camera provided an embodiment of the present disclosure.

FIG. 2 is a schematic view of a first view of an overall structure of the vehicle-use camera provided in the present embodiment, in which the first view is in a direction of viewing from the top along a wiring portion 400, wherein the wiring section 402 runs through in a gap between a vehicle door 600 and a front fender 700 of the vehicle.

Figure 3:
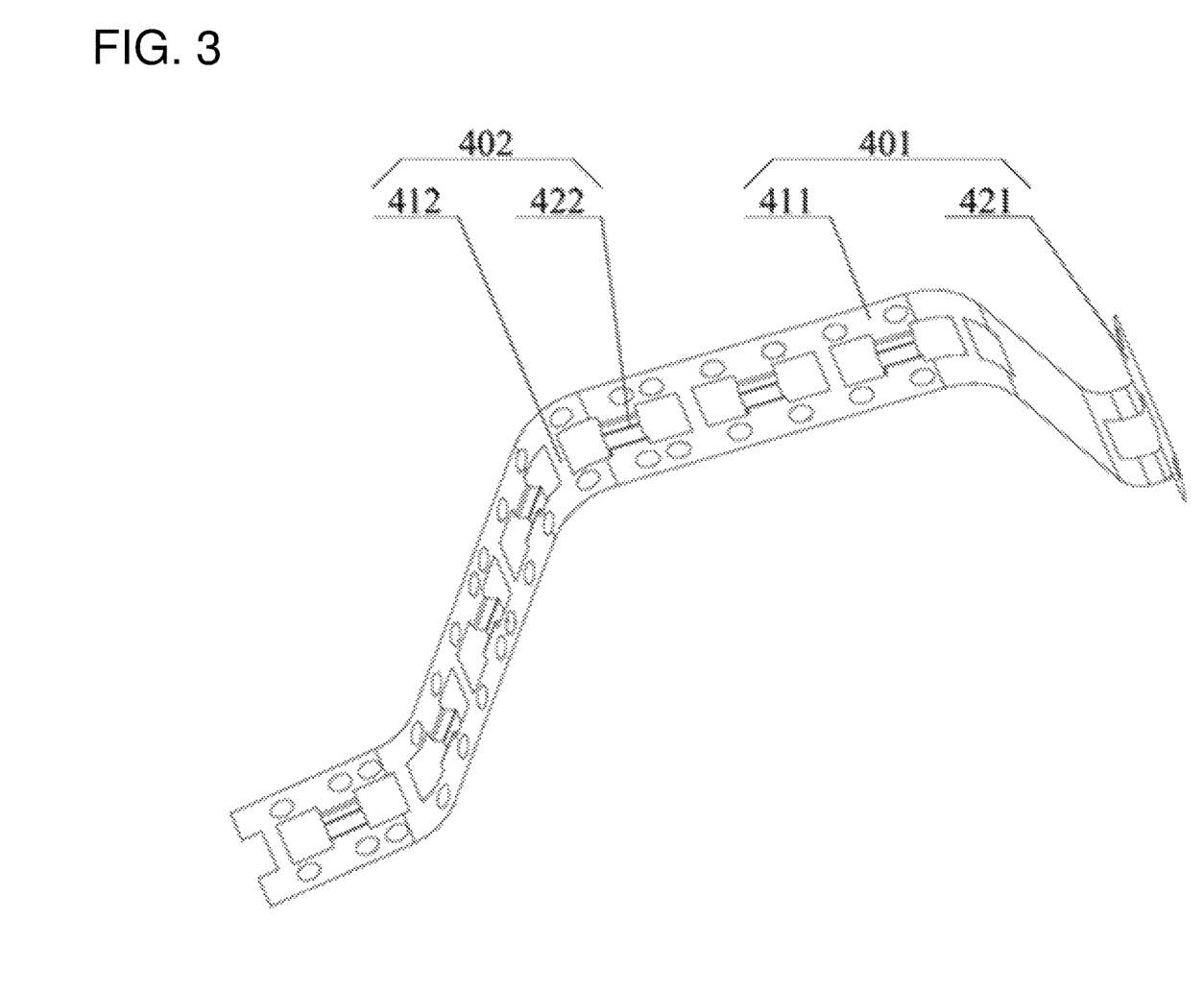
FIG. 3 is a schematic structural view of a wiring portion of a vehicle-use camera provided in an embodiment of the present disclosure.

FIG. 3 is a schematic structural view of a wiring portion of the vehicle-use camera provided in the present embodiment, in which the wiring portion 400 includes a wiring section 402 and a fixing section 401.

Figure 4:
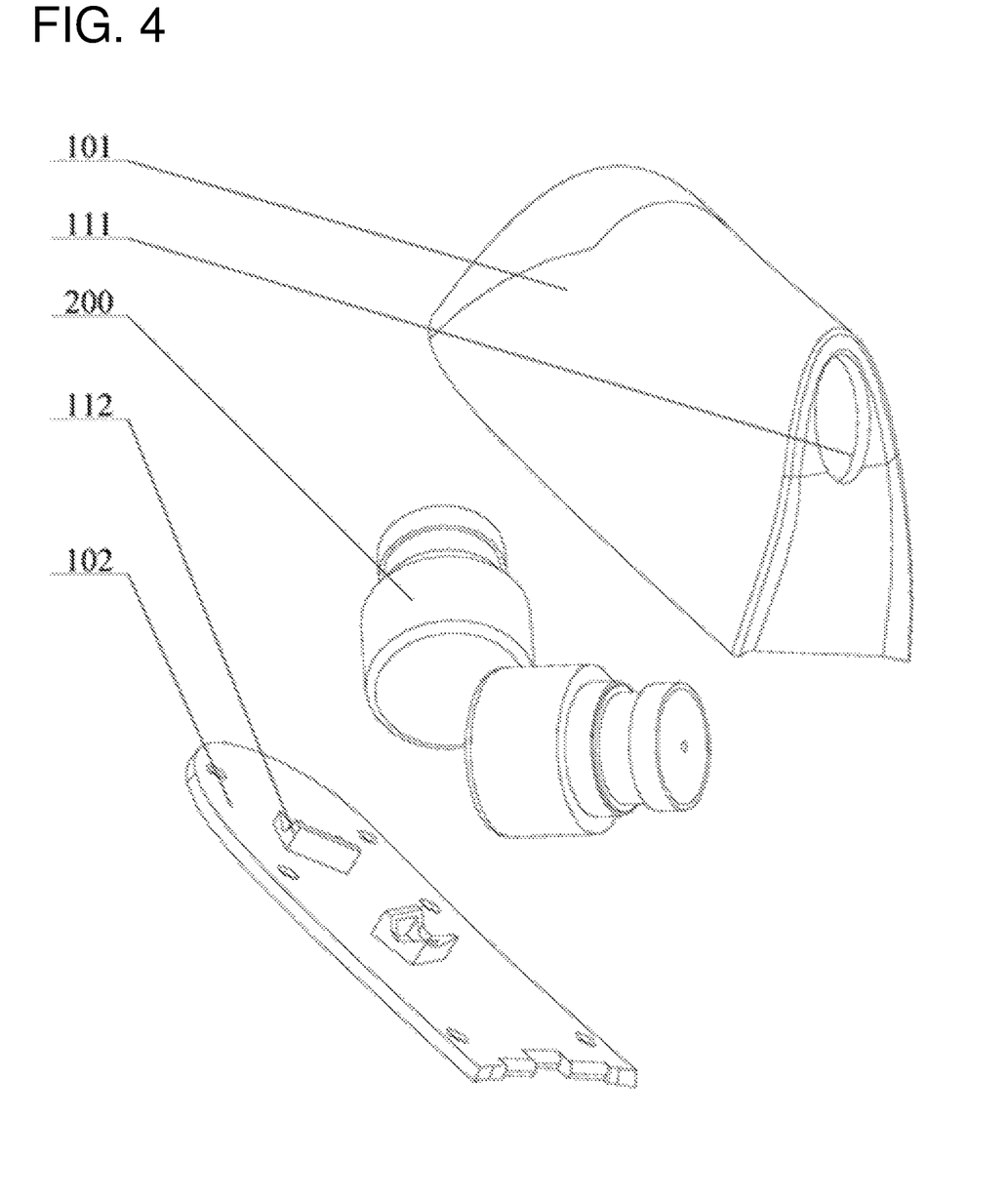
FIG. 4 is a schematic structural view of a housing of a vehicle-use camera provided in an embodiment of the present disclosure.

FIG. 4 is a schematic structural view of a housing of the vehicle-use camera provided in the present embodiment, in which the housing 100 includes a bottom casing 102 and an outer casing 101.

Figure 5:
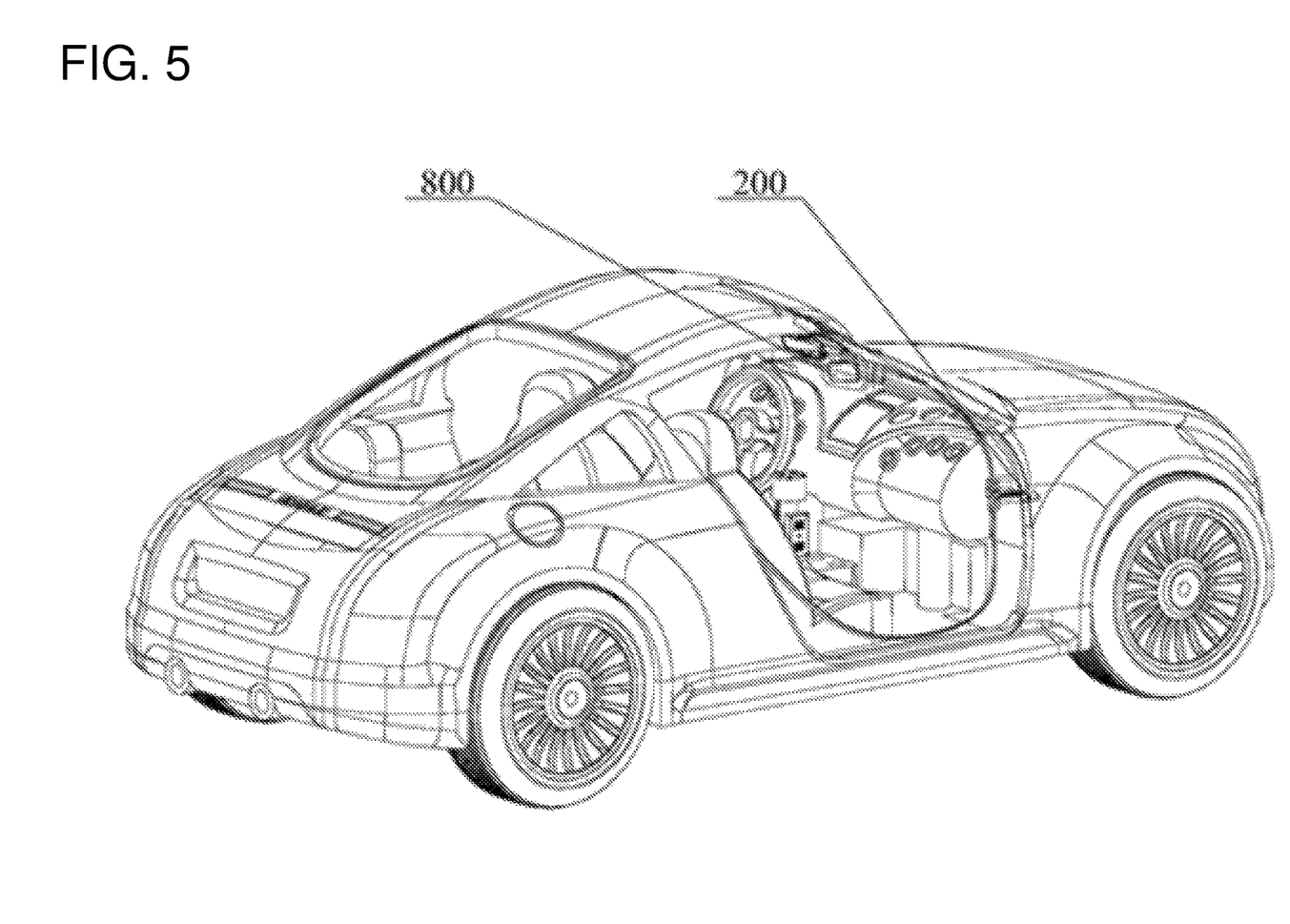
FIG. 5 is a schematic view of an overall structure of an automobile provided in an embodiment of the present disclosure.

FIG. 5 is a schematic view of an overall structure of an automobile provided in the present embodiment, in which a display screen 800 is provided inside the vehicle.

As shown in FIG. 1 to FIG. 5, the present embodiment provides a vehicle-use camera, including: a housing 100, a camera body 200, a wire rod 300, a wiring portion 400, and a fixing device 500, wherein the camera body 200 is provided in the housing 100, the housing 100 is connected with a side edge of a vehicle body of the vehicle, the wire rod 300 is connected with the camera body 200, and one end of the wire rod 300 away from the camera body 200 protrudes from the housing 100; the wiring portion 400 includes a wiring section 402 and a fixing section 401, wherein the wiring section 402 is connected with the fixing section 401, the fixing section 401 is connected with an end of the housing 100 where the wire rod 300 protrudes, and the fixing section 401 is connected with a side edge of a vehicle body of the vehicle; the wire rod 300 is connected with the wiring section 402 by the fixing section 401; the wiring section 402 is configured to run through a gap between the vehicle door 600 and the front fender 700 of the vehicle, such that the wire rod 300 is connected with a display screen 800 inside the vehicle via the gap between the vehicle door 600 and the front fender 700; and a plurality of fixing devices 500 are provided at positions along the wire rod 300, and the plurality of fixing devices 500 each are connected with a waterproof rubber strip at the vehicle door 600 and a pillar of the vehicle door, so as to control a direction in which the wire rod 300 runs.

In the above, there may be several types of fixing device 500, for example, a wire nailing (fixing) slot, a rubber fixing strip, a tape, etc., and preferably, the fixing device 500 is a rubber fixing strip. Specifically, the rubber fixing strip is an arc-shaped and elongate rubber fixing strip, and after the wiring portion 400 brings the wire rod 300 to pass through the gap between the vehicle door 600 and the front fender 700, the arc-shaped and elongate rubber fixing strips are respectively attached at suitable positions of a waterproof rubber strip at the front portion of the side panel of the vehicle (near the front pillar), the wire rod 300 is fixed in a middle groove of the arc-shaped and elongate rubber fixing strip to control a direction in which the wire rod 300 runs, and two ends of each of the arc-shaped and elongate rubber fixing strips are bonded with the waterproof rubber strip at the vehicle door 600 of the vehicle, such that the wire rod 300 can be more stable and aesthetically pleasing.

Further, the wiring section 402 is located in the fixing section 401, and the fixing section 401 is detachably connected with a side edge of the vehicle body of the vehicle, so as to connect the wiring section 402 with the vehicle body, with the wiring section and the vehicle body abutting each other; and the fixing section 401 is detachably connected with the housing 100.

The fixing section 401 is connected with a side edge of a vehicle body of the vehicle in various modes, for example, by screw connection, by bonding, by riveting, etc., and preferably, the fixing section 401 is connected with a side edge of the vehicle body of the vehicle by screw connection, so as to prevent unnecessary loss due to scratch of the wiring portion 400 by the vehicle door 600.

The housing 100 may be connected with a side edge of a vehicle body of the vehicle in various modes, for example, by screw connection, by riveting, by bonding, etc., and preferably, the housing 100 is connected with a side edge of a vehicle body of the vehicle by screw connection.

There may be various types of materials of the wiring portion 400, for example, plastic, metal, rubber, etc., and preferably, the material of the wiring portion 400 is metal.

Further, the material of the wiring portion 400 is a flexible material such that the wiring portion 400 can be pre-bent depending on different vehicle models, so as to conveniently pass through the gap between the front fender 700 and the vehicle door 600.

Preferably, the material of the wiring portion 400 is an alloy material, such that the wiring portion 400 may keep a flexibility on the basis of having a certain degree of strength, thereby ensuring that the wiring portion 400 can be bent freely along with the gap between the vehicle door 600 and the front fender 700, without the occurrence of breakage.

The connection relation between the wiring section 402 and the fixing section 401 may be integral formation, or the wiring section 402 and the fixing section 401 are fixedly connected, for example, by soldering, riveting, bonding, etc. Preferably, the connection relation between the wiring section 402 and the fixing section 401 is integral formation.

The present embodiment provides a vehicle-use camera, including: a housing 100, a camera body 200, a wire rod 300, a wiring portion 400 and a fixing device 500, wherein the camera body 200 is provided in the housing 100, the housing 100 is connected with a side edge of a vehicle body of the vehicle, the wire rod 300 is connected with the camera body 200, and one end of the wire rod 300 away from the camera body 200 protrudes from the housing 100; the wiring portion 400 includes a wiring section 402 and a fixing section 401, the wiring section 402 is connected with the fixing section 401, the fixing section 401 is connected with an end of the housing 100 where the wire rod 300 protrudes; the wire rod 300 is connected with the wiring section 402 by the fixing section 401; the wiring section 402 is configured to run through a gap between the vehicle door 600 and the front fender 700 of the vehicle, such that the wire rod 300 is connected with a display screen 800 inside the vehicle via the gap between the vehicle door 600 and the front fender 700; and a plurality of fixing devices 500 are provided at positions along the wire rod 300, and the plurality of fixing devices 500 each are connected with the waterproof rubber strip at the vehicle door 600 and the pillar of the vehicle door, so as to control a direction in which the wire rod 300 runs. The wire rod 300 can be fixed by the wiring portion 400, the wiring portion 400 is connected with a side edge of a vehicle body of the vehicle by the fixing section 401, and the wiring section 402 is configured to run through the gap between the vehicle door 600 and the front fender 700 of the vehicle, bringing the wire rod 300 to pass through the gap between the vehicle door 600 and the front fender 700 of the vehicle to protrude into the vehicle, such that there is no need to disassemble the vehicle door 600, and then the wire rod 300 can be arranged inside the vehicle in an ordered and attached way by the plurality of fixing devices 500, thereby controlling the direction in which the wire rod 300 runs, thus alleviating the existing technical problems in the prior art that the wire harnesses are scattered inside the vehicle door 600, and the vehicle door 600 needs to be disassembled if wiring is arranged in the rubber tube connected with the vehicle door 600 and with the vehicle body, which leads to a long time for installation, and causes the buckles of the vehicle door 600 to be easily damaged and the vehicle door 600 to be loosened, or causes a vibration noise, and also reducing the installation difficulty of the camera at the side, whereby the promotion and application of the product is facilitated, and the product is more practical.

On the basis of the above mentioned embodiments, further, the wiring section 402 of the camera for a vehicle provided in the present embodiment is provided thereon with a plurality of grooves 422 and a plurality of beams 412, wherein the plurality of grooves 422 and the plurality of beams 412 are sequentially provided at intervals, and the plurality of beams 412 are each connected with the fixing section 401, and the wire rod 300 sequentially runs through in the plurality of grooves 422 and the plurality of beams 412.

Since a plurality of grooves 422 are sequentially provided at intervals along the wiring section 402, beams 412 are provided between adjacent two grooves 422; and when protruding from the camera body 200 of the housing 100, the wire rod 300 may run through sequentially between the plurality of grooves 422 and the plurality of beams 412 after passing the fixing section, thereby ensuring that the wire rod 300 may be fixed along the plurality of grooves 422 and the plurality of beams 412.

The wire rod 300 may be fixed in the groove 422, such that the wire rod 300 does not directly contact two ends of the gap between the vehicle door 600 and the front fender 700 of the vehicle, thereby ensuring that the wire rod 300 does not affect the use of the camera body 200 due to a breakage caused by bending, and thus is more practical.

Further, the wire rod 300 is in a flat shape; and specifically, the wire rod 300 is a flat wire, such that the wire rod 300 can be better attached with the beams 412 of the wiring section 402, avoiding the wire rod 300 from being squeezed by the vehicle body due to a too high thickness of the wire rod 300 which affects the use of the wire rod 300.

For the camera for a vehicle provided in the present embodiment, a plurality of grooves 422 and a plurality of beam 412 are provided on the wiring section 402, such that the wire rod 300 can be inserted sequentially along the plurality of grooves 422 and the plurality of beam 412, ensuring a high strength of the wire rod 300 in a running direction thereof, and the wire rod 300 is in a flat shape, which further facilitates the running thereof through the wiring section 402, such that the wire rod 300 is not disturbed by the vehicle door 600 so as to avoid a potential hazard that the wire rod is entangled and broken by being pulled, and thus the wire rod is more practical.

On the basis of the above-mentioned embodiments, further, the vehicle-use camera provided in the present embodiment is provided with a plurality of camera bodies 200, wherein the plurality of camera bodies 200 each are provided in the housing 100, and the housing 100 is provided therein with a plurality of camera ports 111, and lenses of the plurality of camera bodies 200 each protrude from the plurality of camera ports 111 respectively, such that the plurality of camera bodies 200 take images in a plurality of orientations.

In the above, the number of the camera bodies 200 may be one, two, three, four, etc. Preferably, the number of the camera bodies 200 is two, and the two camera bodies 200 can take images of the vehicle body in a more comprehensive manner, thus avoiding the presence of blind areas.

Further, the housing 100 includes a bottom casing 102 and an outer casing 101; wherein the bottom casing 102 is connected with the outer casing 101, a placement cavity is formed between the bottom casing 102 and the outer casing 101, the plurality of camera bodies 200 are provided in the placement cavity, and the outer casing 101 is provided with the plurality of camera ports 111 respectively in a plurality of directions.

The bottom casing 102 may be connected with the outer casing 101 in various modes, for example, by snap-fit connection, by screw connection, by riveting, etc., and preferably, the bottom casing 102 is connected with the outer casing 101 by screw connection.

Further, the fixing section 401 includes a first fixing section 411 and a second fixing section 421; wherein the first fixing section 411 is fixedly connected with the second fixing section 421, a plurality of fixing ends are provided along an edge of the first fixing section 411, and the first fixing section 411 is detachably connected with a side edge of a vehicle body of the vehicle by the fixing ends; and the second fixing section 421 is provided at a position where the bottom casing 102 is connected with the outer casing 101, and the second fixing section 421 is connected with both the bottom casing 102 and the outer casing 101, such that the wire rod 300 runs through in the wiring section 402 via the second fixing section 421.

Here, the connection mode between the first fixing section 411 and the second fixing section 421 may be integral formation, or the first fixing section 411 and the second fixing section 421 are fixedly connected, for example, by soldering, bonding, etc. Preferably, the connection mode between the wiring section 411 and the fixing section 421 is integral formation.

The second fixing section 421 is provided with a hook portion, and by inserting the second fixing section 421 between the bottom casing 102 and the outer casing 101, the first fixing section 411 may be connected with the second fixing section 421 by the hook portion.

The second fixing section 421 may be connected with the bottom casing 102 and the outer casing 101 in various modes, for example, by screw connection, threading connection, and snap-fit connection, etc., and preferably, the second fixing section 421 is connected with the bottom casing 102 and the outer casing 101 by screw connection. Specifically, the second fixing section 421 is inserted between the bottom casing 102 and the outer casing 101, and screw holes are respectively provided at corresponding positions of the bottom casing 102, the second fixing section 421, and the outer casing 101, and by inserting screws into the screw holes, the second fixing section 421 may be connected with the housing 100, and it is ensured that the wire rod 300 may be connected with the wiring section 402 along the second fixing section 421, and thus may run through and be connected along the wiring section 402.

Further, the bottom casing 102 is provided with a plurality of placement portions 112, wherein the plurality of camera bodies 200 are each connected with the bottom casing 102 by the plurality of placement portions 112 respectively such that lenses of the plurality of camera bodies 200 are each fixed at the plurality of camera ports 111 respectively.

The placement portion 112 may be connected with the camera body 200 in various modes, for example, by threading connection, snap-fit connection, and bonding, etc. Preferably, the placement portion 112 is connected with the camera body 200 by snap-fit connection.

The number of the placement portions 112 provided corresponds to the number of the camera bodies 200 such that the plurality of camera bodies 200 are snap-fitted in the plurality of placement portions 112 respectively.

For the vehicle-use camera provided in the present embodiment, a plurality of camera bodies 200 are provided, and the plurality of camera bodies 200 each are provided in the housing 100, such that images of the vehicle body can be taken in a more comprehensive manner, thus avoiding the presence of the blind areas; moreover, the housing 100 includes a bottom casing 102 and an outer casing 101, wherein the bottom casing 102 is provided with a plurality of placement portions 112 for placing the camera bodies 200, such that the camera bodies 200 do not sway in the housing 100 due to bumps, and the stability of the camera bodies 200 is ensured; in addition, the fixing section 401 includes a first fixing section 411 and a second fixing section 421, which facilitates the connection of the second fixing section 421 with the housing 100, and then the wiring portion 400 is fixed to the side edge of the vehicle body of the vehicle by the first fixing section 411, thus ensuring the strength of the wire rod 300, and making the design more reasonable and more practical.

FIG. 5 is a schematic view of an overall structure of an automobile provided in the present embodiment, in which a display screen 800 is provided inside a vehicle.

As shown in FIG. 5, the present embodiment provides an automobile, including the vehicle-use camera, wherein a display screen 800 is provided inside the vehicle, and the display screen 800 is electrically connected with a camera body 200 via the wire rod 300, such that images taken by the camera body 200 is transmitted to the display screen 800, which facilitates the driver to determine conditions around the vehicle better. In addition, since other technical effects of the automobile provided in the embodiment are the same as the technical effects of the camera for a vehicle provided above, details are not repeated herein.

Finally, it should be noted that the above embodiments are only used for illustrating the technical solutions of the present disclosure, rather than limiting the same; although the present disclosure has been described in detail with reference to the foregoing embodiments, those ordinarily skilled in the art should appreciate that: it is still possible to modify the technical solutions described in the foregoing embodiments or make equivalent substitutions to some or all of the technical features therein; and these modifications or substitutions do not make the essence of the corresponding technical solutions depart from the scope of technical solutions of various embodiments of the present disclosure.

INDUSTRIAL APPLICABILITY

In summary, the present disclosure provides a vehicle-use camera and an automobile, which has a simple structure, is convenient to be installed, and the installation thereof does not cause a relatively severe damage to the structure of the vehicle itself, thus having a high adaptability to the vehicle model, and can be installed in and applied to various types of vehicles.

The invention claimed is:

1. A vehicle-use camera, comprising: a housing, a camera body, a wire rod, a wiring portion, and a plurality of fixing devices,
   wherein the camera body is provided in the housing, the housing is connected with a side edge of a vehicle body of a vehicle, the wire rod is connected with the camera body, and one end of the wire rod away from the camera body protrudes from the housing;
   the wiring portion comprises a wiring section and a fixing section, the wiring section is connected with the fixing section, the fixing section is connected with an end of the housing where the wire rod protrudes, and the fixing section is connected with the side edge of the vehicle body of the vehicle; the wire rod is connected with the wiring section by the fixing section; and the wiring section is configured to run through a gap between a vehicle door and a front fender of the vehicle, enabling the wire rod to pass through the gap between the vehicle door and the front fender to be connected with a display screen inside the vehicle; and
   the plurality of fixing devices are provided at positions along the wire rod, and the plurality of fixing devices each are connected with a waterproof rubber strip at the vehicle door and a pillar of the vehicle door, so as to control a direction in which the wire rod runs,
   wherein the housing comprises a bottom casing and an outer casing, the fixing section comprises a first fixing section and a second fixing section, the second fixing section is inserted between the bottom casing and the outer casing, the second fixing section is further provided thereon with a hook portion, and the first fixing section is connected with the second fixing section by the hook portion.

2. The vehicle-use camera according to claim 1, wherein each of the fixing devices comprises an arc-shaped and elongate rubber fixing strip provided at a position corresponding to the pillar of the vehicle door; and
   the wire rod is fixed in a middle groove of the arc-shaped and elongate rubber fixing strip.

3. The vehicle-use camera according to claim 2, wherein the wiring section is located in the fixing section, and the fixing section is detachably connected with the side edge of the vehicle body of the vehicle, so as to connect the wiring section to the vehicle body, with the wiring section and the vehicle body abutting each other; and the fixing section is detachably connected with the housing.

4. The vehicle-use camera according to claim 3, wherein the wiring section and the fixing section are integrally formed, or the wiring section is fixedly connected with the fixing section.

5. The vehicle-use camera according to claim 2, wherein the wire rod is in a flat shape.

6. The vehicle-use camera according to claim 1, wherein the wiring section is provided thereon with a plurality of grooves and a plurality of beams, the plurality of grooves and the plurality of beams are sequentially provided at intervals, and the plurality of beams each are connected with the fixing section, and the wire rod is sequentially runs through in the plurality of grooves and the plurality of beams.

7. The vehicle-use camera according to claim 6, wherein the wire rod is fixedly provided in each of the grooves.

8. The vehicle-use camera according to claim 1, wherein a material of the wiring portion is a flexible material such that the wiring portion can be bent along the gap between the vehicle door and the front fender.

9. The vehicle-use camera according to claim 8, wherein the material of the wiring portion is an alloy material.

10. The vehicle-use camera according to claim 1, wherein a plurality of the camera bodies are provided, the plurality of camera bodies each are provided in the housing, the housing is provided therein with a plurality of camera ports, and lenses of the plurality of camera bodies each protrude through the plurality of camera ports respectively, such that the plurality of camera bodies take images in a plurality of orientations.

11. The vehicle-use camera according to claim 10, wherein the housing is provided therein with two camera ports provided at an angle to one another, and two camera bodies are provided, lenses of the two camera bodies each protrude from the camera port respectively.

12. The vehicle-use camera according to claim 10, wherein the bottom casing is connected with the outer casing, a placement cavity is formed between the bottom casing and the outer casing, the plurality of camera bodies are provided in the placement cavity, and the outer casing is provided with the plurality of camera ports respectively in a plurality of directions.

13. The vehicle-use camera according to claim 12, wherein the bottom casing is detachably connected with the outer casing by a threaded fastening connector.

14. The vehicle-use camera according to claim 13, wherein the first fixing section is fixedly connected with the second fixing section, a plurality of fixing ends are provided along an edge of the first fixing section, and the first fixing section is detachably connected with a side edge of a vehicle body of the vehicle by the fixing ends; and the second fixing section is provided at a position where the bottom casing is connected with the outer casing, and the second fixing section is connected with both the bottom casing and the outer casing, such that the wire rod runs through in the wiring section via the second fixing section.

15. The vehicle-use camera according to claim 12, wherein the first fixing section is fixedly connected with the second fixing section, a plurality of fixing ends are provided along an edge of the first fixing section, and the first fixing section is detachably connected with a side edge of a vehicle body of the vehicle by the fixing ends; and the second fixing section is provided at a position where the bottom casing is connected with the outer casing, and the second fixing section is connected with both the bottom casing and the outer casing, such that the wire rod runs through in the wiring section via the second fixing section.

16. The vehicle-use camera according to claim 15, wherein the first fixing section and the second fixing section are integrally formed, or the first fixing section is fixedly connected with the second fixing section.

17. The vehicle-use camera according to claim 12, wherein the bottom casing is provided with a plurality of placement portions, the plurality of camera bodies are connected with the bottom casing by the plurality of placement portions, such that lenses of the plurality of camera bodies are each fixed at the plurality of camera ports respectively.

18. The vehicle-use camera according to claim 1, wherein the wire rod is in a flat shape.

19. An automobile, comprising the vehicle-use camera according to claim 1.

* * * * *

UNITED STATES PATENT AND TRADEMARK OFFICE
CERTIFICATE OF CORRECTION

Page 1 of 1

PATENT NO. : 10,661,724 B2
APPLICATION NO. : 16/307589
DATED : May 26, 2020
INVENTOR(S) : Lei Pan

It is certified that error appears in the above-identified patent and that said Letters Patent is hereby corrected as shown below:

On the Title Page

Item (71), "Applicant: GLOBAL MEDIA INDUSTRY GROUP CO., LTD., Shenzhen (CN)" should be -- Applicant: GLOBAL MEDIA INDUSTRY GROUP CO., LTD., Shenzhen (CN); and Lei Pan, Shenzhen (CN) --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*